June 14, 1927.

I. AMUNDSEN 1,632,387

REFRIGERATING MACHINE OF THE ABSORPTION TYPE

Filed Feb. 21, 1925

Patented June 14, 1927.

1,632,387

UNITED STATES PATENT OFFICE.

IVAR AMUNDSEN, OF OSLO, NORWAY.

REFRIGERATING MACHINE OF THE ABSORPTION TYPE.

Application filed February 21, 1925, Serial No. 10,972, and in Norway February 22, 1924.

This invention relates to a refrigerating plant of the absorption type comprising a generator-absorber vessel, a condenser and an evaporator, the generator-absorber vessel containing an absorption medium, and being alternately cooled and heated to cause said absorption medium to alternately absorb and liberate a refrigerant gas, the change-over from cooling to heating and vice versa being effected automatically.

The invention relates particularly to apparatus of this type wherein the generator-absorber vessel and its contents are cooled by circulating cooling water through suitable passages in the vessel, and the change-over from generation to absorption is effected by means which in turn are operated by cooling, or other water, supplied to the apparatus.

It has already been proposed in refrigerating apparatus of this kind to effect the intermittent starting and stopping of the cooling and heating arrangements for the generator-absorber vessel by mechanism or valves which in turn are operated by the rocking movement of water tanks which rock under the weight of water which flows into them, means in some cases being provided for regulating the flow of water into said tanks.

It has also been proposed to provide refrigerating apparatus in which a generator-absorber vessel is heated intermittently, the fuel supply conduit of the heater being alternately opened and closed through the medium of a float member which rises and falls with the varying water level in a water tank and which serves to open and close a valve in the conduit. According to the present invention a refrigerating plant of the type referred to is provided in which the intermittent supply of cooling water to the generator-absorber vessel takes place through a single stationary water tank provided with a known form of intermittent outlet device such as an automatic siphon, or a float valve, for example, the operation of which is controlled by the level of the water in the tank. In such case means such as cocks or the like being provided both in the inlet and outlet pipes to and from said tank whereby the duration of the filling and emptying periods of the water tank may be accurately controlled and varied as desired.

This invention also consists in a refrigerating plant having the beforementioned features and in which the cutting in and out of the device for heating the generator-absorber vessel is effected by means of a member, actuated either by the intermittent flow of water through the generator-absorber vessel, or by the varying level of the water in the water tank.

The invention is illustrated by way of example in the accompanying drawings in which:

Fig. 1 shows, diagrammatically, an embodiment of the invention in which electric heating of the generator absorber vessel is used.

Fig. 2 shows a second embodiment wherein the heating of the generator-absorber is effected by means employing gaseous or liquid fuel.

Referring to Fig. 1, 1 designates the generator-absorber vessel, 35 a condenser and 38 an evaporator. 4 is the cooling device of the absorption vessel. 17 is a water tank serving as a collector for cooling water for the absorption vessel, and at the same time as a cooler for the condenser 35. The tank 17 is provided with a supply conduit for the cooling water and the inflow of water through said conduit is controllable by the cock 18. The tank 17 is placed in connection with the cooling device 4 by means of a siphon 19.

The cooling device 4 is provided with an outlet conduit furnished with a control cock 20, and is also in connection with a U-shaped glass tube 21 containing a column of mercury 22. In this U-shaped tube are provided contacts 23 and 24 which are arranged in series in the circuit of an electric heating element 25 in the absorption vessel. Between the column 22 of mercury and the cooling water there may be, and preferably is, arranged a layer of oil 26 or the like. A switch 27 in the electric circuit of the heater serves to start and interrupt the operation of the plant.

The condenser 35 (Fig. 1) comprises a tube coil connected at one end to the evaporating vessel 36 which is provided with an insulating cover 40. From the bottom of the evaporating vessel the insulated tube 37 leads downwards terminating in a non-insulated evaporating tube coil 38. Tube 38 is led up above the highest level of the liquid ($h_1$) in the evaporating vessel 36. A screen or cup 39 may be mounted over the outlet opening of the evaporating tube.

The operation of the plant is as follows:

As water flows through the inlet conduit under the control of cock 18 and into the water tank 17, the water level in the tank rises to $H_1$. When this level is reached, the siphon 19 enters into operation, and cooling water flows through the cooling device 4 and out through the outlet conduit under the control of cock 20. This flow continues until the water level in the tank 9 has sunk to $H_2$. During the time that the cooling water is flowing the pressure in device 4 causes the column of mercury 22 to be displaced, and the electric current supply to the heating element 25 is thus interrupted through the movement of the mercury away from contact 24. When the flow of cooling water through the device 4 ceases, the column of mercury is permitted to return to its original position, so that contact is made between the mercury and contact 24 and the heating period of the absorption vessel commences and continues until the water level in the tank 5 again reaches $H_1$.

The evaporator operates in the following manner. It is supposed that the period of liberation of gas from the absorption vessel commences when the level of liquid in the evaporating vessel is at the bottom of the vessel as indicated at $h_2$. During the period of liberation the refrigerating gas is condensed in condenser 35 and the condensed refrigerating liquid flows into evaporating vessel 40, filling the same. The circulation of the refrigerating liquid through tube 37 and 38 during this period is prevented by the fact that the top of tube 38 lies above the highest level of the refrigerating liquid in evaporating vessel 36. Hereby the loss of efficiency owing to condensation in the evaporating tank is reduced to a minimum.

When the period of liberation is interrupted and the period of absorption in the absorption vessel 1 is started, evaporation begins to take place in evaporating tube 38. The gas and liquid passing out at the top of the tube 38 impinges against cup 39 from which the liquid particles are deflected back to the liquid in the vessel, whereas the evaporated medium passes out through tube 35 and 12 to the absorption vessel.

The duration of the heating and cooling periods is thus regulated by adjustment of the cocks 18 and 20.

If, instead of electric heating means, a heating device employing gaseous or liquid fuel be used, the starting and stopping arrangement illustrated in Fig. 2 may be used. In this form a column 22 of liquid is adapted by its displacement to open and close the outlet opening of a fuel supply tube 28 which opens into tube 10. Ignition at a burner 29 takes place by means of a small igniting flame at the end of a tube 30.

It will be understood that the invention may be carried out in ways other than those described and indicated in the drawings.

Thus the automatically operating siphon tank may be replaced by a float controlled tank of a known construction, the float automatically controlling the inlet and outlet openings of the tank.

Further the cutting in and out of the heating device may take place directly by means of the float, by means of a simple mechanical transmission and thus make the tube 21 superfluous. Also the tank 17 need not necessarily be combined with the condenser, but may also be mounted separately.

Having now particularly described and ascertained the nature of my invention, and in what manner the same is to be performed, I declare that what I claim is:

A refrigerating plant, comprising a generator-absorber vessel, a stationary cooling water tank, a cooler for the vessel, an intermittent outlet device discharging from the tank, to said cooler, controlled by the water level in the tank, an inlet pipe for the tank, and an outlet pipe for said cooler, control means in the inlet and outlet pipes whereby the duration of the filling and emptying periods of the tank can be accurately controlled and varied as desired, a heating element for the vessel, and a member actuated by the intermittent flow of water from said tank for cutting the heating element into and out of operation.

In testimony that I claim the foregoing as my invention I have signed my name.

IVAR AMUNDSEN.